(12) United States Patent
Bao et al.

(10) Patent No.: US 11,662,580 B2
(45) Date of Patent: May 30, 2023

(54) IMAGE DISPLAY METHOD, APPARATUS, AND SYSTEM TO REDUCE DISPLAY LATENCY

(71) Applicant: Huawei Technologies Co., Ltd., Shenzhen (CN)

(72) Inventors: Xiaodong Bao, Dongguan (CN); Cuijuan Ma, Dongguan (CN); Yin Huang, Shenzhen (CN); Jianbin Liu, Hangzhou (CN); Guang Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 17/186,455

(22) Filed: Feb. 26, 2021

(65) Prior Publication Data
US 2021/0181506 A1    Jun. 17, 2021

Related U.S. Application Data

(63) Continuation of application No. PCT/CN2019/102897, filed on Aug. 27, 2019.

(30) Foreign Application Priority Data

Aug. 28, 2018 (CN) .......................... 201810990852.8

(51) Int. Cl.
*G02B 27/01* (2006.01)

(52) U.S. Cl.
CPC ...... *G02B 27/017* (2013.01); *G02B 2027/014* (2013.01); *G02B 2027/0123* (2013.01); *G02B 2027/0141* (2013.01)

(58) Field of Classification Search
CPC ............ G02B 27/017; G02B 2027/014; G02B 27/0172; G02B 27/0093; G02B 2027/0123; G02B 2027/0187; G02B 2027/0141; H04N 21/6587; H04N 21/65; H04N 21/654; H04N 21/658; H04N 13/117; H04N 19/597;
(Continued)

(56) References Cited

U.S. PATENT DOCUMENTS

2016/0323560 A1   11/2016  Jin et al.
2017/0115488 A1*  4/2017  Ambrus ............. G02B 27/0172
(Continued)

FOREIGN PATENT DOCUMENTS

CN   102348068 A   2/2012
CN   105847785 A   8/2016
(Continued)

*Primary Examiner* — Xuemei Zheng
(74) *Attorney, Agent, or Firm* — Conley Rose, P.C.

(57) ABSTRACT

A terminal device sends first information to a cloud device, where the first information indicates a posture and a location of the terminal device at a first moment. Then, the terminal device receives information about a first field of view image from the cloud device, where the first field of view image is a field of view image corresponding to the posture and the location of the terminal device at the first moment. The terminal device displays an image within a field of view range of the terminal device at a second moment based on the information about the first field of view image and a posture change and a location change of the terminal device from the first moment to the second moment.

22 Claims, 8 Drawing Sheets

(58) Field of Classification Search
CPC ......... H04N 21/23412; H04N 21/2393; H04N 21/41407; G06F 3/012; G06F 3/011
See application file for complete search history.

(56) References Cited

U.S. PATENT DOCUMENTS

| | | | |
|---|---|---|---|
| 2017/0285694 A1 | 10/2017 | Kim et al. | |
| 2018/0047332 A1* | 2/2018 | Kuwahara | G09G 3/2096 |
| 2018/0077209 A1* | 3/2018 | So | H04L 65/70 |
| 2018/0146189 A1* | 5/2018 | Park | H04N 13/344 |
| 2018/0192001 A1* | 7/2018 | Boyce | H04N 19/46 |
| 2021/0240258 A1* | 8/2021 | Son | G06F 3/14 |

FOREIGN PATENT DOCUMENTS

| | | | | |
|---|---|---|---|---|
| CN | 106502427 A | | 3/2017 | |
| CN | 106919360 A | | 7/2017 | |
| CN | 106998409 A | * | 8/2017 | ............. G06F 3/011 |
| CN | 106998409 A | | 8/2017 | |
| EP | 3057089 A1 | | 8/2016 | |
| KR | 20170062439 A | | 6/2017 | |
| WO | 2015128634 A1 | | 9/2015 | |

\* cited by examiner

IMAGE DISPLAY METHOD, APPARATUS, AND SYSTEM TO REDUCE DISPLAY LATENCY

CROSS-REFERENCE TO RELATED APPLICATIONS

This is a continuation of Int'l Patent App. No. PCT/CN2019/102897, filed on Aug. 27, 2019, which claims priority to Chinese Patent App. No. 201810990852.8, filed on Aug. 28, 2018, which are incorporated by reference.

FIELD

This disclosure relates to the field of image display technologies, and in particular, to an image display method, an apparatus, and a system.

BACKGROUND

A virtual reality (VR) technology is a computer simulation system in which a virtual world can be created and experienced. The technology uses a computer to generate a simulation environment, which is a system simulation of a multi-source information fusion, an interactive three-dimensional dynamic view, and entity behavior, so that a user is immersed in the environment.

Currently, to obtain better user experience, in the VR technology, a VR device is generally combined with a local high-performance host, and the local high-performance host implements functions of an application such as logical operation and image rendering, and finally outputs a display image to the VR device. However, this method undoubtedly increases user costs, and consequently the VR technology cannot be popularized, and is limited in a user group. Therefore, a cloud VR solution is proposed. A concept of cloud computing is combined with the VR technology in the cloud VR solution. In the cloud VR solution, VR content such as application data and video data is deployed on a cloud device, and functions of an application such as logical operation and image rendering are implemented on the cloud device. A user can experience various VR applications such as a VR game and a VR movie as long as the user has a VR device. The cloud VR solution can effectively reduce user consumption costs and improve user experience.

However, because the functions such as logical operation and image rendering are transferred to the cloud device in the cloud VR, the VR device can display a field of view (FOY) image processed by the cloud device only after receiving the image. This undoubtedly increases a display latency, and an excessively high display latency deteriorates user experience.

SUMMARY

This disclosure provides an image display method, an apparatus, and a system, to resolve a problem of an excessively high display latency in cloud VR.

According to a first aspect, an embodiment provides an image display method. The method includes: A terminal device sends first information to a cloud device, where the first information needs to indicate a posture and a location of the terminal device at a first moment. Then, the terminal device receives information about a first field of view image from the cloud device, where the first field of view image is a field of view image corresponding to the posture and the location of the terminal device at the first moment. After receiving the first field of view image, the terminal device may display an image within a field of view range of the terminal device at a second moment based on the information about the first field of view image and a posture change and a location change of the terminal device from the first moment to the second moment, where the second moment is later than the first moment.

According to the foregoing method, after receiving the information about the first field of view image, the terminal device may display the image within the field of view range of the terminal device at the second moment after the first moment based on the information about the first field of view image and the posture change and the location change of the terminal device from the first moment to the second moment, instead of displaying an image within a field of view range of the terminal device at the first moment, so that a time period from the second moment at which the posture and the location of the terminal device change to a moment at which the terminal device displays the image within the field of view range of the terminal device at the second moment can be effectively shortened. In other words, an image display latency can be shortened, and this can further improve user experience.

In a possible design, to display the image within the field of view range of the terminal device at the second moment, the first field of view image needs to be converted. The information about the first field of view image needs to include the first field of view image. The terminal device may convert the first field of view image into a second field of view image based on the location change of the terminal device from the first moment to the second moment. The second field of view image is a field of view image corresponding to a location of the terminal device at the second moment. In other words, a field of view range of the second field of view image is consistent with a field of view range of the first field of view image, and better covers all possible field of view ranges of the terminal device at the second moment. Then, the terminal device displays the image within the field of view range of the terminal device in the second field of view image based on the posture change of the terminal device from the first moment to the second moment.

According to the foregoing method, the first field of view image is converted based on the location change of the terminal device from the first moment to the second moment, to obtain the second field of view image, so that the image within the field of view range of the terminal device at the second moment can be more conveniently determined from the second field of view image. Therefore, a time period from the second moment at which the posture and the location of the terminal device change to a moment at which the image within the field of view range of the terminal device at the second moment is displayed can be shortened, and user experience can be better improved.

In a possible design, when converting the first field of view image into the second field of view image based on the location change of the terminal device from the first moment to the second moment, the terminal device first needs to determine, based on the location change of the terminal device from the first moment to the second moment, depth information of the second field of view image and pixel change information for converting the first field of view image into the second field of view image. Then, the terminal device converts the first field of view image into the second field of view image based on the depth information of the second field of view image and the pixel change information.

According to the foregoing method, it can be ensured that the first field of view image is accurately converted into the second field of view image based on the depth information of the second field of view image and the pixel change information that are obtained by the terminal device based on the location change from the first moment to the second moment. Then, the terminal device may display the image within the field of view range of the terminal device at the second moment based on the second field of view image, to shorten a display latency.

In a possible design, the depth information of the second field of view image and the pixel change information need to be obtained in the following manner: the information about the first field of view image further includes depth information, and the terminal device determines the depth information of the second field of view image based on the depth information in the information about the first field of view image and the location change of the terminal device from the first moment to the second moment; and the information about the first field of view image further includes a motion vector, the motion vector is used to represent change trends of pixels in the first field of view image, and the terminal device determines the pixel change information based on the motion vector and the location change of the terminal device from the first moment to the second moment.

According to the foregoing method, the depth information of the second field of view image and the pixel change information can be simply and conveniently determined based on the related information of the first field of view image such as the depth information and the motion vector of the first field of view image, to ensure that the first field of view image is subsequently converted into the second field of view image. Further, a display latency may be effectively shortened.

In a possible design, before displaying the image within the field of view range of the terminal device at the second moment, the terminal device may determine the field of view range of the terminal device at the second moment based on a posture of the terminal device at the second moment.

According to the foregoing method, it can be ensured that the terminal device accurately displays the image within the field of view range of the terminal device at the second moment, and user experience can be improved.

In a possible design, the first field of view image includes an image within a field of view range of the terminal device at the first moment, and a field of view range of the first field of view image is greater than the field of view range of the terminal device at the first moment.

According to the foregoing method, the field of view range of the first field of view image is relatively large, to ensure that after the first field of view image is converted into the second field of view image, the second field of view image can cover a relatively large field of view range, and can include images in all possible field of view ranges of the terminal device at the second moment. Finally, the image within the field of view range of the terminal device at the second moment can be better displayed.

According to the second aspect, an embodiment provides an image display method. The method includes: First, a cloud device receives first information from a terminal device, where the first information is used to indicate a posture and a location of the terminal device at a first moment. Then, the cloud device renders a prestored environment image of the terminal device based on the first information, to obtain a first field of view image, where the first field of view image is a field of view image corresponding to the posture and the location of the terminal device at the first moment. After completing rendering, the cloud device sends information about the first field of view image to the terminal device.

According to the foregoing method, after receiving the first information, the cloud device may output the first field of view image, and when sending the first field of view image to the terminal device, the cloud device further needs to add other information of the first field of view image, to ensure that the terminal device can display an image within a field of view range of the terminal device at a second moment based on the information about the first field of view image and a posture change and a location change of the terminal device from the first moment to the second moment. Further, a time period from the second moment at which the posture change and the location of the terminal device change to a moment at which the image within the field of view range of the terminal device at the second moment is displayed can be effectively shortened, and an image display latency can be shortened, thereby further improving user experience.

In a possible design, the information about the first field of view image includes the first field of view image, depth information, and a motion vector.

According to the foregoing method, the information about the first field of view image is sent to the terminal device, so that the terminal device can conveniently convert the first field of view image. Finally, the terminal device can better display the image within the field of view range of the terminal device at the second moment, to shorten a display latency, and improve user experience.

In a possible design, the first field of view image includes an image within a field of view range of the terminal device at the first moment, and a field of view range of the first field of view image is greater than the field of view range of the terminal device at the first moment.

According to the foregoing method, the field of view range of the first field of view image is relatively large, to ensure that a second field of view image converted from the first field of view image can cover a relatively large field of view range, and can cover images in all possible field of view ranges of the terminal device at the second moment. Finally, the image within the field of view range of the terminal device at the second moment can be better displayed.

According to a third aspect, an embodiment further provides an apparatus. The apparatus is applied to a terminal device. For beneficial effects, refer to the description in the first aspect. Details are not described herein again. The apparatus has functions of implementing actions in the method example of the first aspect. The functions may be implemented by hardware, or may be implemented by hardware by executing corresponding software. The hardware or software includes one or more modules corresponding to the foregoing functions. In a possible design, a structure of the apparatus includes a sending unit, a receiving unit, and a display unit. These units can execute corresponding functions in the foregoing method example of the first aspect. For details, refer to the detailed descriptions in the method example. Details are not described herein again.

According to a fourth aspect, an embodiment further provides an apparatus. The apparatus is applied to a cloud device. For beneficial effects, refer to the description in the second aspect. Details are not described herein again. The apparatus has functions of implementing actions in the method example of the second aspect. The functions may be implemented by hardware, or may be implemented by hardware by executing corresponding software. The hardware or software includes one or more modules corresponding to the foregoing functions. In a possible design, a structure of the apparatus includes a receiving unit, a processing unit, and a sending unit. These units can execute corresponding functions in the foregoing method example of the second aspect. For details, refer to the detailed descriptions in the method example. Details are not described herein again.

According to a fifth aspect, an embodiment further provides an apparatus. The apparatus is applied to a terminal device. For beneficial effects, refer to the description in the first aspect. Details are not described herein again. A structure of the communications apparatus includes a processor, a transceiver, and a memory. The processor is configured to support the terminal device in performing corresponding functions in the method in the first aspect. The memory is coupled to the processor and stores a program instruction and data that are necessary for the communications apparatus. The transceiver is configured to communicate with another device. A display may be further included, and is configured to receive an instruction from the processor and display an image.

According to a sixth aspect, an embodiment further provides an apparatus. The apparatus is applied to a cloud device. For beneficial effects, refer to the description in the second aspect. Details are not described herein again. A structure of the apparatus includes a processor, a transceiver, and a memory. The processor is configured to support the cloud device in performing corresponding functions in the method in the second aspect. The memory is coupled to the processor and stores a program instruction and data that are necessary for the apparatus. The transceiver is configured to communicate with another device.

According to a seventh aspect, an embodiment further provides a computer readable storage medium. The computer readable storage medium stores an instruction, and when the instruction is run on a computer, the computer is enabled to perform the methods according to the foregoing aspects.

According to an eighth aspect, an embodiment further provides a computer program product including an instruction, and when the instruction is run on a computer, the computer is enabled to perform the methods according to the foregoing aspects.

According to a ninth aspect, an embodiment further provides a computer chip. The chip is connected to a memory. The chip is configured to read and execute a software program stored in the memory, to perform the methods according to the foregoing aspects.

DETAILED DESCRIPTION

This disclosure provides an image display method, a device, and a system, to resolve a problem of deteriorated user experience because of an excessively high display latency in a cloud VR solution.

In an existing cloud VR solution, a cloud device may implement functions of an application such as logical operation and image rendering, and a VR device only receives an FOV image and displays an image. The following describes a specific procedure of the existing cloud VR solution.

Figure 1:
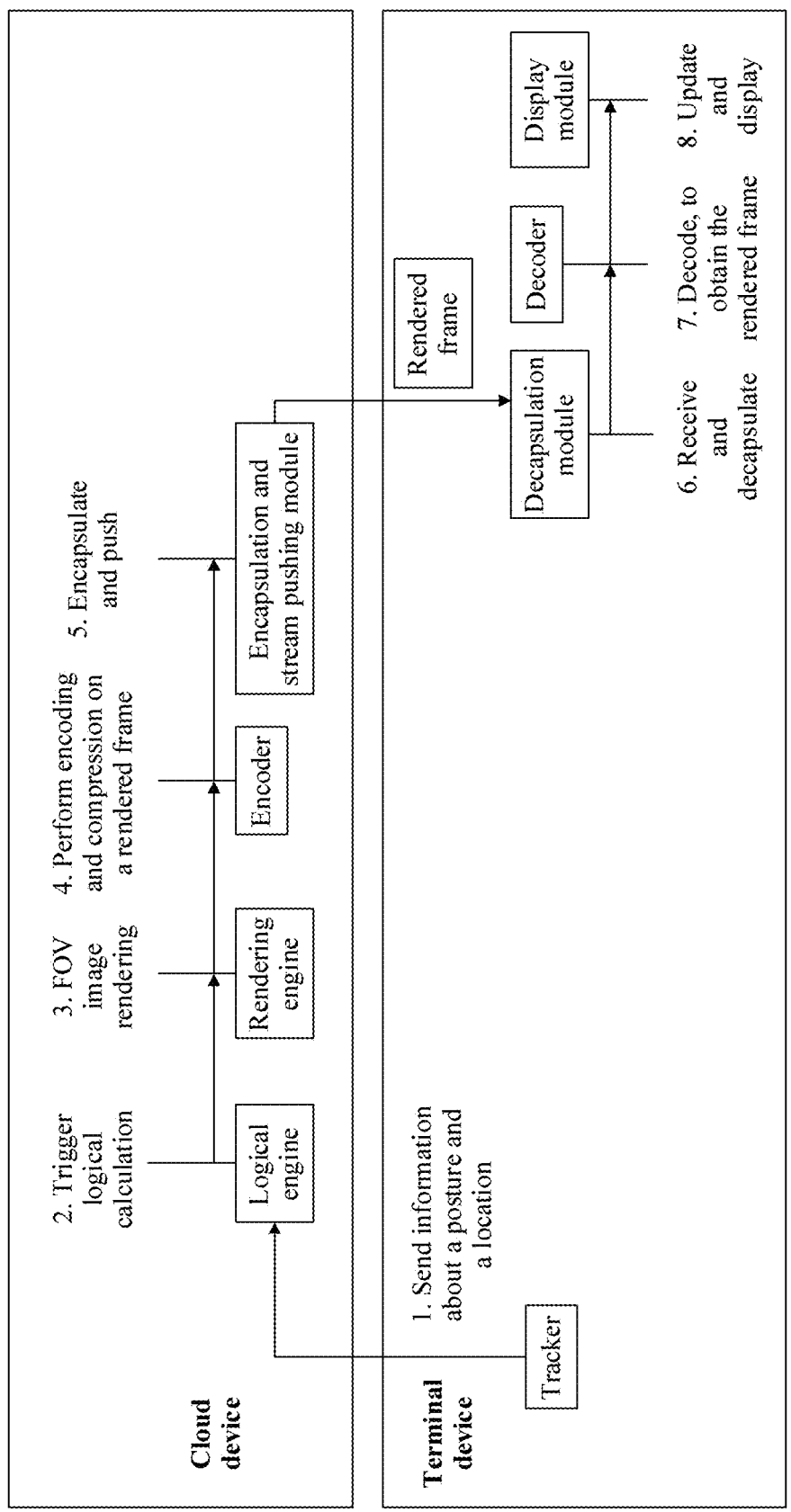
FIG. 1 is a flowchart of an existing cloud VR solution.

As shown in FIG. 1, a tracker in the VR device first captures a posture and a location of the VR device, and uploads information about the captured posture and location to the cloud device.

The cloud device obtains, at a fixed frequency, the information about the posture and the location that is uploaded by the VR device, and performs corresponding updating. After obtaining the information about the posture and the location that is uploaded by the VR device, the cloud device triggers a logical engine in the cloud device to start a logical operation.

After performing the logical operation, the logical engine in the cloud device outputs logical information obtained after the logical operation to a rendering engine in the cloud device. The rendering engine in the cloud device performs FOV image rendering based on the logical information, outputs a rendered frame, and sends the rendered frame to an encoder in the cloud device for processing such as encoding and compression. The encoder in the cloud device sends the processed rendered frame to an encapsulation and stream pushing module in the cloud device.

The encapsulation and stream pushing module in the cloud device encapsulates the processed rendered frame, and pushes the encapsulated rendered frame to the VR device.

A decapsulation module in the VR device receives and decapsulates data delivered by the cloud device, and sends the decapsulated data to a decoder in the VR device.

The decoder in the VR device decodes the decapsulated data to obtain the rendered frame, and sends the rendered frame to a display module in the VR device as a display frame.

The display module in the VR device refreshes and displays the display frame.

It can be learned from the foregoing description that, in the cloud VR solution, the logical operation and the image rendering are transferred to the cloud device, and a series of processing operations such as encoding and compression, encapsulation, and pushing are additionally performed by the cloud device. Actually, the series of processing operations performed by the cloud device and display performed by the VR device are performed in serial mode. The VR device can display a new image only after the cloud device completes the series of processing operations (such as the logical operation, the FOV image rendering, the encoding and compression, and encapsulation). Consequently, a time period from a moment at which a posture and a location of the VR device change to a moment at which the VR device displays an image corresponding to the posture and the location of the VR device is increased, and a display latency is increased. In other words, for a moment, a time period from the moment at which a posture and a location of the VR device change to a moment at which a corresponding image at the moment is displayed is prolonged. A display latency is a key factor that affects user experience in the VR technology. If the display latency is excessively high, user experience is severely affected.

It should be noted that the display latency in the embodiments is a time period from a moment at which a posture and a location of a terminal device (for example, the VR device) change to a moment at which the terminal device displays a corresponding image.

Therefore, this disclosure provides an image display method, an apparatus, and a system, to effectively shorten the display latency in the cloud VR solution and further improve user experience. The following provides detailed descriptions with reference to the accompanying drawings.

Figure 2:
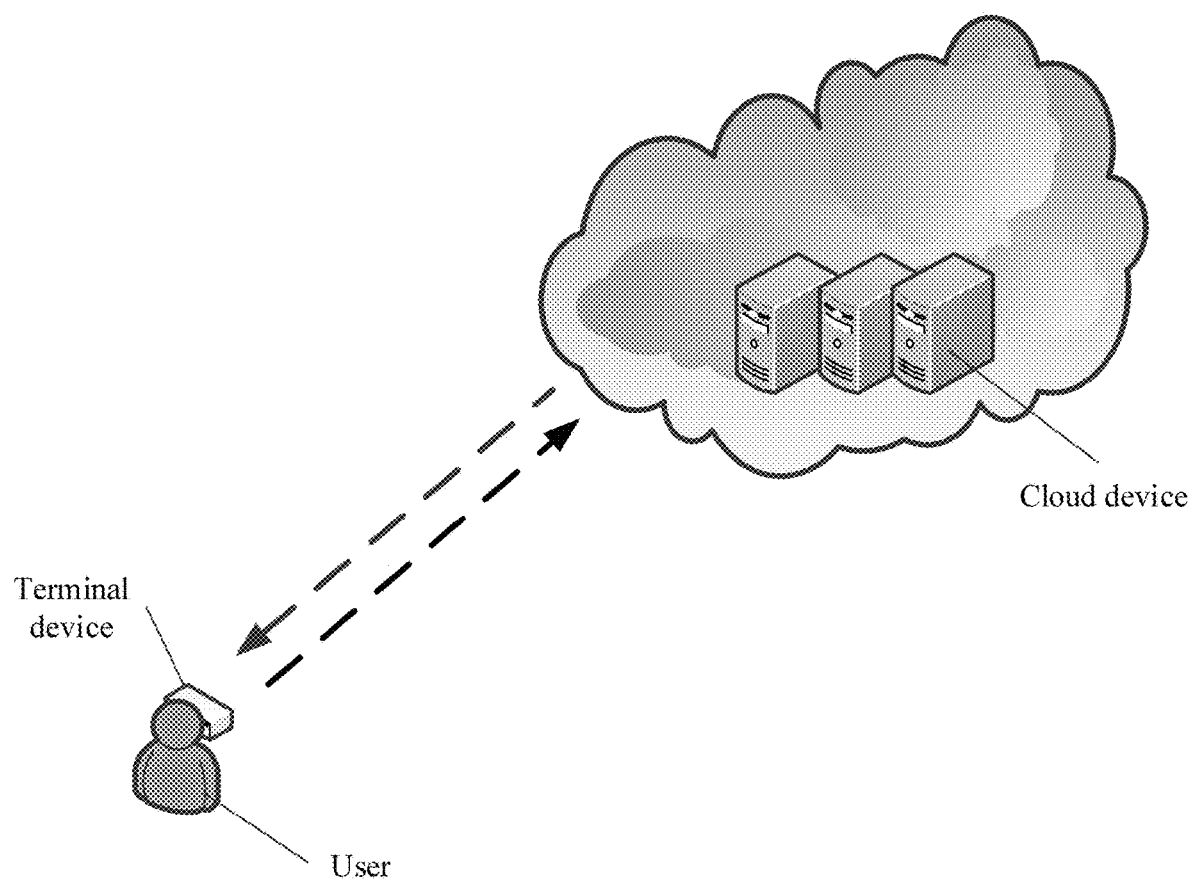
FIG. 2 is a schematic architectural diagram of a network system.

FIG. 2 is a schematic architectural diagram of a network system according to an embodiment. The network system includes a cloud device and a terminal device.

The cloud device is a remote server deployed on a cloud, and the cloud device needs to have a relatively strong graphics processing function and a data computing function, for example, may perform rendering and a logical operation. The cloud device may be a many-core server, a computer on which a graphics processing unit (GPU) cluster is deployed, a large-scale distributed computer, a cluster computer with pooled hardware resources, or the like. In the embodiments, the cloud device may output a field of view image based on a posture and a location of the terminal device, and send information (such as depth information, a motion vector, and the field of view image) about the field of view image to the terminal device.

The cloud device may further store application data of the terminal device, for example, data such as an environment image in an application. Storing the application data of the terminal device in the cloud device not only can relieve data storage pressure of the terminal device, but also can ensure security of the application data in the terminal device to prevent the application data from being stolen.

The terminal device may capture a posture and a location of the terminal device, and may also display an image in a VR application to a user through a display. The terminal device may locally store data of the VR application. Alternatively, the terminal device may not locally store data of the VR application, but stores the data of the VR application in the cloud device, and loads the data of the VR application through the cloud device when the terminal device needs to run the VR application.

The terminal device includes a device worn on the head of the user, for example, VR glasses or a VR helmet, or may include a device worn on another part of the user such as a hand, an elbow, a foot, or a knee of the user, for example, a game handle. In the embodiments, the terminal device also needs to have a graphics processing capability and an image display capability. For example, the terminal device needs to perform reprojection based on a field of view image obtained from the cloud device, to obtain an image that can be displayed, and present the image to the user. In addition, the terminal device needs to capture a posture and a location of the terminal device, and needs to have an action capturing capability. For example, the terminal device needs to have functions such as tactile feedback, gesture recognition, and eye tracking.

The device that is included in the terminal device and that is worn on the head of the user may capture a change of the head of the user and convert the change into a posture and a location of the terminal device, and may further display an image within a field of view range of the terminal device to the user. The device that is included in the terminal device and that is worn on a part other than the head of the user may capture an action change of the part of the user, and convert the action change into a posture and a location of the terminal device.

In the embodiments, a posture and a location of the terminal device at a first moment or a second moment should be a posture and a location of the terminal device that are generated by a motion of the user wearing the terminal device, and the posture and the location of the terminal device at the first moment or the second moment needs to reflect a motion orientation and a motion end point of the user.

Figure 3:
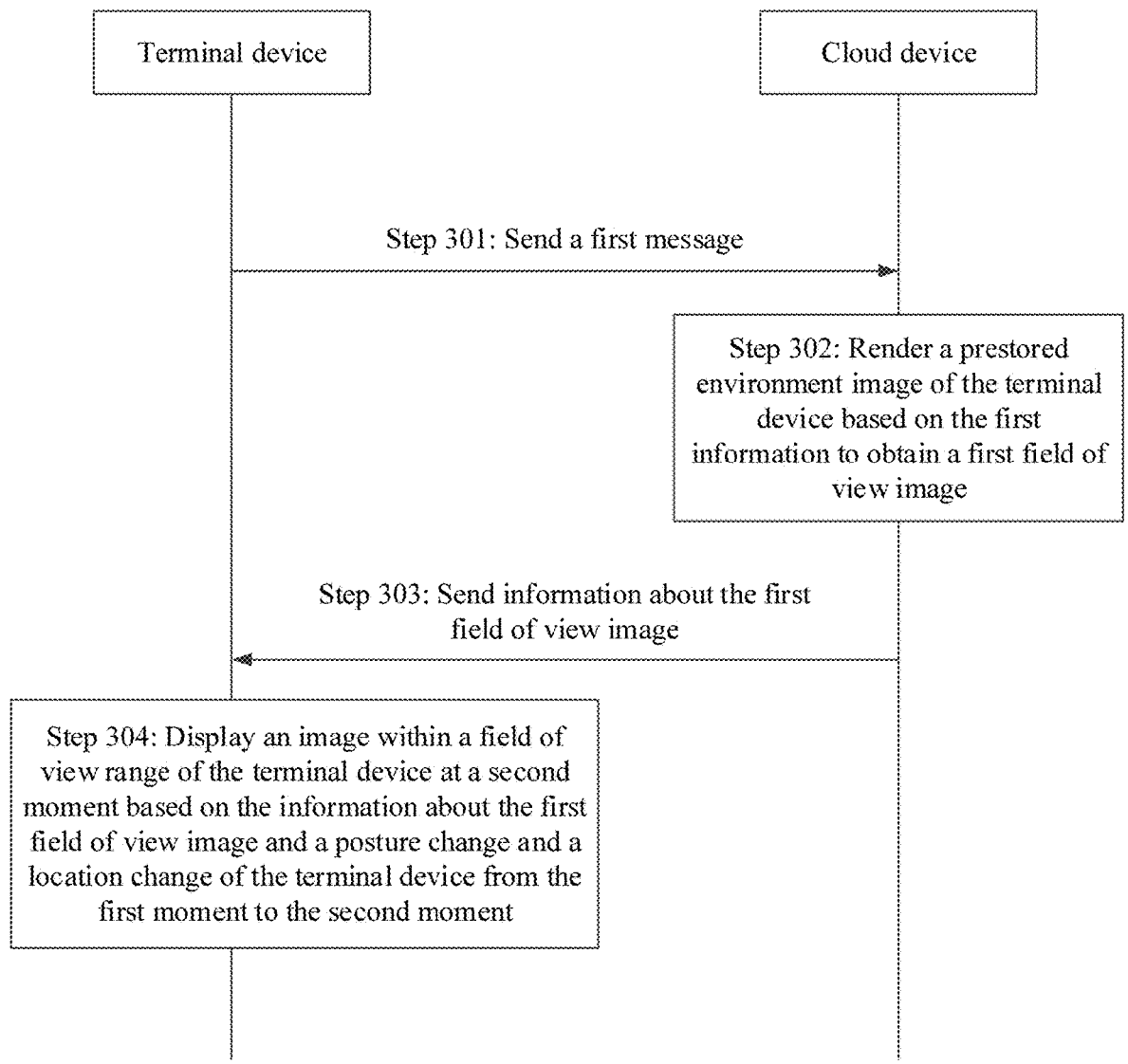
FIG. 3 is a schematic diagram of an image display method.

Based on the network system shown in FIG. 2, an embodiment provides an image display method. As shown in FIG. 3, the method includes the following steps.

Step 301: The terminal device sends first information to the cloud device. The first information is used to indicate a posture and a location of the terminal device at a first moment.

The posture and the location of the terminal device include the posture of the terminal device and the location of the terminal device. The posture of the terminal device is a rotation status of the terminal device in space. The posture of the terminal device may be represented in many manners, for example, a location of a central axis of the terminal device in space and an angle at which the central axis of the terminal device rotates when the terminal device rotates, for another example, projection areas of the terminal device on three surfaces that are perpendicular to each other in space when the terminal device rotates. The location of the terminal device is a location of the terminal device in space. The location of the terminal device may be represented in many manners, for example, a coordinate point of the terminal device in a three-dimensional coordinate system. Alternatively, another manner may be used. This is not limited in this embodiment. Any posture and location that can represent the terminal device is applicable to this embodiment.

Before the terminal device sends the first information to the cloud device, the terminal device may first obtain the posture and the location of the terminal device at the first moment.

The terminal device may obtain the posture and the location of the terminal device at the first moment by using a built-in apparatus, or may obtain the posture and the location of the terminal device at the first moment by using another device. For example, when a user wears the terminal device to play a VR game, a device such as a sensor capable of capturing a motion of the user may be disposed near the user.

In a possible implementation, a tracker may be deployed in the terminal device, and the tracker in the terminal device can capture a posture and a location of the terminal device. A capturing manner may be set based on a specific scenario. For example, the tracker in the terminal device may capture a posture and a location of the terminal device in real time, or may periodically capture a posture and a location of the terminal device, or may obtain a posture and a location of the terminal device at a time point based on an application run on the terminal device. For example, an application currently run on the terminal device is a dance game with a specific rhythm, a posture and a location of the terminal device may change only at a rhythm point, and the tracker in the terminal device may start to capture a posture and a location of the terminal device only before the specific rhythm point.

In another possible implementation, the terminal device may identify, through a deployed sensor such as an infrared sensor or a temperature sensor, a motion status of the user wearing the terminal device at the first moment. The deployed sensor may identify a motion status of the user wearing the terminal device in real time, and when detecting that the motion status of the user wearing the terminal device changes at the first moment, may immediately send the motion status of the user wearing the terminal device at the first moment to the terminal device. Then, the terminal device converts the motion status of the user wearing the terminal device into the posture and the location of the terminal device at the first moment. The deployed sensor may be deployed near the user wearing the terminal device, or may be deployed on the body of the user wearing the terminal device.

The foregoing manners of obtaining the posture and the location of the terminal device at the first moment through the tracker and the sensor are all examples for description. Actually, in actual application, the posture and the location of the terminal device at the first moment may be obtained in many manners. This is not limited in this embodiment. Any manner in which the posture and the location of the terminal device at the first moment can be obtained is applicable to this embodiment.

After obtaining the posture and the location of the terminal device at the first moment, the terminal device may directly send the first information to the cloud device. For another example, the terminal device may retain a posture and a location of the terminal device at a historical moment, and the posture and the location at the historical moment include at least a posture and a location of the terminal device at a moment before the first moment. Alternatively, the terminal device may send the posture and the location of the terminal device at the first moment to the cloud device only when the posture and the location of the terminal device at the first moment are different from a posture and a location of the terminal device at a moment before the first moment.

Step 302: After the cloud device receives the first information from the terminal device, the cloud device renders a prestored environment image of the terminal device based on the first information, to obtain a first field of view image. The first field of view image is a field of view image corresponding to the posture and the location of the terminal device at the first moment.

In a possible implementation, after receiving the first information, the cloud device may periodically update a posture and a location of the terminal device that are stored in the cloud device. In other words, the cloud device updates, at a frequency, the posture and the location of the terminal device that are stored in the cloud device. After receiving the first information, the cloud device does not necessarily immediately obtain the posture and the location of the terminal device at the first moment from the first information, but obtains the posture and the location of the terminal device at the first moment from the first information at a time point, and updates the posture and the location of the terminal device that are locally stored in the cloud device. Alternatively, the cloud device may update, in real time, the posture and the location of the terminal device that are stored in the cloud device, and update the posture and the location of the terminal device that are stored in the cloud device as long as receiving the first information. In this way, the posture and the location of the terminal device can be obtained in real time.

After the cloud device receives the first information, the cloud device may perform a logical operation on the posture and the location of the terminal device at the first moment.

The logical operation is a process of performing logical determining based on the posture and the location of the terminal device at the first moment, to determine status information of an image that needs to be displayed by the terminal device at the first moment. The status information of the image that needs to be displayed by the terminal device at the first moment represents a status change, of the image that should be displayed, that is caused by the posture and the location of the terminal device at the first moment, and includes status information of materials such as a person, an object, and a background included in the image that needs to be displayed by the terminal device at the first moment.

For example, a shooting game is currently run on the terminal device, information about the posture and the location of the terminal device at the first moment shows that shooting is being performed, and a logical operation is to obtain information such as whether a target is hit in a current shooting action and a hit location.

For example, a logical engine may be deployed in the cloud device, and the logical engine in the cloud device performs a logical operation based on the posture and the location of the terminal device at the first moment, to obtain the status information of the image that needs to be displayed by the terminal device at the first moment.

The logical engine in the cloud device is a logical operation module deployed in the cloud device, and the logical engine represents the logical operation module in the cloud device in this embodiment. The logical operation module in the cloud device may alternatively be an independent processor. A specific representation form and a name of the logical operation module in the cloud device are not limited in this embodiment. Any module that can perform a logical operation is applicable to this embodiment.

The cloud device renders the prestored environment image of the terminal device based on the status information of the image that needs to be displayed by the terminal device at the first moment.

The cloud device may prestore application data of the terminal device, such as, all environment images of an application on the terminal device. For example, the application on the terminal device is a game application. The cloud device may prestore basic environment images in the game application, including images such as a person, an object, and a background in the game application.

The cloud device may determine, by using the status information of the image that needs to be displayed by the terminal device at the first moment, data of the image that should be displayed by the terminal device at the first moment. The data includes the images such as a person, an object, and a background that should be displayed in the image. The cloud device may further determine and render the environment image that needs to be rendered, to obtain the first field of view image.

Rendering may be simply understood as a process of forming a binocular visual image by projecting objects in three-dimensional virtual space into a plane according to perspective.

For example, a rendering engine is deployed in the cloud device, and the rendering engine may render the environment image of the terminal device based on data obtained through the logical operation, to obtain the first field of view image.

The rendering engine in the cloud device is a module that is deployed in the cloud device and that performs image rendering, and the rendering engine represents the module that performs image rendering in the cloud device in this embodiment. The module that performs image rendering in the cloud device may alternatively be an independent graphics processing unit. A specific representation form and a name of the module that performs image rendering in the cloud device are not limited in this embodiment. Any module that can perform image rendering is applicable to this embodiment.

The first field of view image is a field of view image corresponding to the posture and the location of the terminal device at the first moment. For example, the first field of view image includes an image within a field of view range of the terminal device at the first moment, and a field of view range of the first field of view image should be greater than the field of view range of the terminal device at the first moment.

The field of view range of the first field of view image is a maximum range of fields of view that can be displayed by the first field of view image. For example, the field of view range of the first field of view image may be considered as a space range, that uses the location of the terminal device at the first moment as a vertex, from materials at an image edge that are displayed in the first field of view image to the terminal device in a three-dimensional space. The field of view range of the first field of view image may be understood as space formed by connection lines between the materials at the image edge that are displayed in the first field of view image and the location of the terminal device in the three-dimensional space.

The field of view range of the terminal device at the first moment is a space range that can be observed by the terminal device at the first moment. A field of view range of the terminal device may be preset. For example, a field of view range of a human eye may be set as the field of view range of the terminal device on delivery, or fixed fields of view are used as the field of view range of the terminal device.

In a possible implementation, the field of view range of the terminal device at the first moment may alternatively be set by the user based on a requirement of the user. A manner of setting the field of view range of the terminal device at the first moment is not limited in this embodiment.

Figure 4:
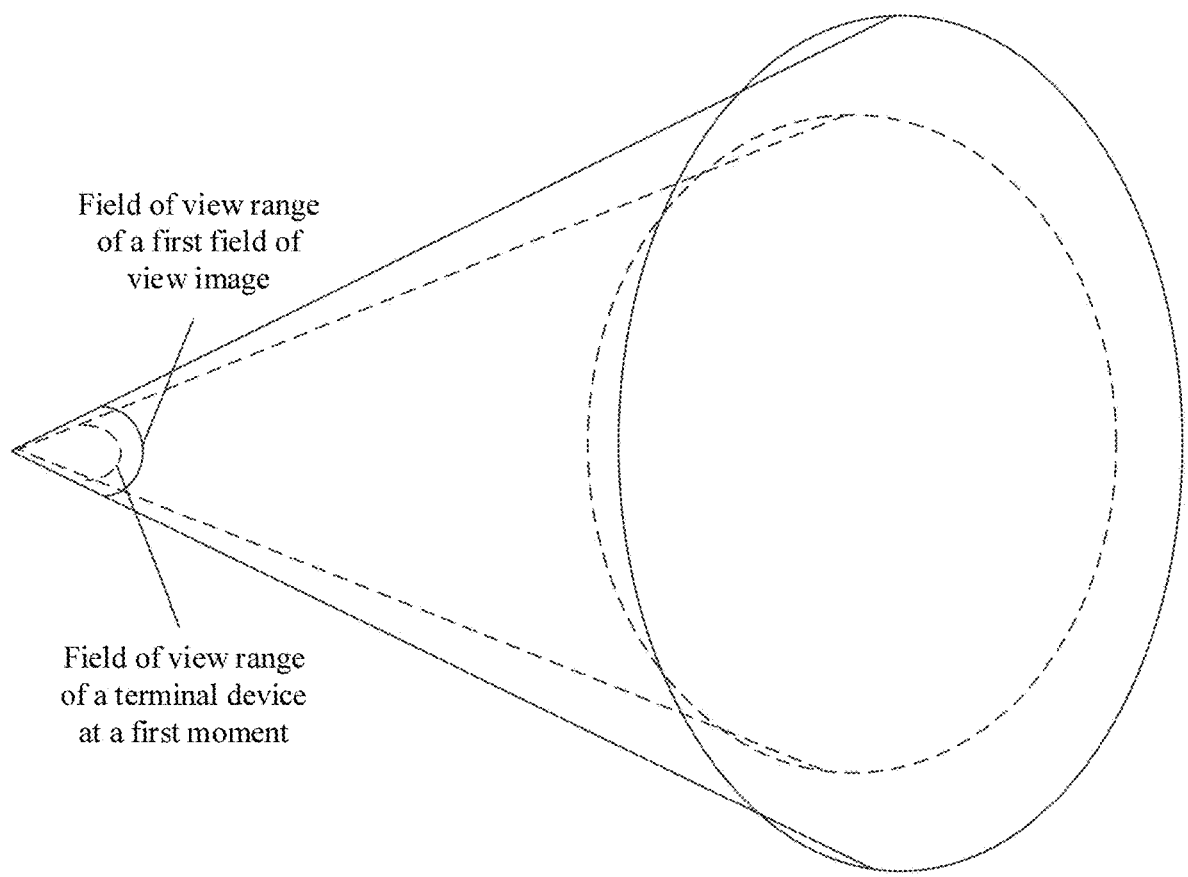
FIG. 4 is a schematic diagram of a field of view range of a first field of view image and a field of view range of a terminal device at a first moment.

For ease of understanding a relationship between the field of view range of the first field of view image and the field of view range of the terminal device at the first moment, the following provides description by using a diagram. FIG. 4 is a schematic diagram of the field of view range of the first field of view image and the field of view range of the terminal device at the first moment. To be specific, the first field of view image needs to cover the image within the field of view range of the terminal device at the first moment, and further needs to include some images beyond the field of view range of the terminal device at the first moment.

A range of the some images beyond the field of view range of the terminal device may evenly extend centering on the field of view range of the terminal device, or may extend in a specific direction starting from the field of view range of the terminal device, and may be determined based on the posture and the location of the terminal device at the first moment. For example, when a field of view of the terminal device reaches a critical location on one side of the field of view range at the first moment, the range of the some images beyond the field of view range of the terminal device may extend from the other side starting from the field of view range of the terminal device.

It should be understood that the field of view range of the first field of view image and the field of view range of the terminal device at the first moment are usually three-dimensional ranges, for example, may be usually abstracted as cones. A vertex of the cone is the terminal device, and a bottom surface of the cone is a range in which an image can be displayed. A vertex angle of the cone corresponding to the field of view range of the first field of view image needs to be greater than that of the cone corresponding to the field of view range of the terminal device at the first moment.

Because the terminal device needs to display an image within a field of view range of the terminal device at a second moment based on the first field of view image, the field of view range of the first field of view image needs to be greater than the field of view range of the terminal device at the first moment, to ensure that the terminal device can more accurately output the image within the field of view range of the terminal device at the second moment.

For example, to make the field of view range of the first field of view image larger, the field of view range of the first field of view image may be larger than field of view ranges of the terminal device in all directions. For example, angles by which the field of view range of the first field of view image extends from the field of view ranges of the terminal device in all directions may be set based on actual scenarios.

In a process of rendering the prestored environment image of the terminal device, the cloud device may further generate depth information of the first field of view image. The depth information is used to indicate distances from materials (images such as a person, an object, and a background) displayed in the first field of view image to the terminal device. For example, the first field of view image includes a figure A, the depth information includes a distance from the figure A to the terminal device.

The terminal device may display an image. Actually, the terminal device may be abstracted as a camera. The image displayed by the terminal device is an image that can be photographed by the camera. A location of the camera is a location of the user in a VR application. The depth information may be understood as distances from the materials (the images such as a person, an object, and a background) displayed in the first field of view image to the virtual camera.

Optionally, the depth information of the first field of view image may be a depth map of the first field of view image.

The cloud device may further obtain a motion vector of the first field of view image. The motion vector is used to represent change trends of pixels in the first field of view image. In other words, each pixel in the first field of view image has a specific movement trend, and the cloud device needs to predict the movement trends of the pixels in the first field of view image, and converts the movement trends of the pixels into the motion vector.

In specific implementation, the pixels in the first field of view image are processed in a block. In other words, a plurality of pixels form one pixel block, and it may be considered that movement trends of the plurality of pixels in the pixel block are the same.

To more conveniently indicate the change trends of the pixels in the first field of view image, the motion vector is used to represent change trends of pixel blocks in the first field of view image.

The motion vector of the first field of view image is obtained during code compression on the first field of view image. A plurality of frames of images are generated during the code compression by the cloud device, and include the first field of view image and an adjacent-frame image of the first field of view image. A specific process of obtaining the motion vector of the first field of view image is as follows:

The cloud device needs to obtain the adjacent-frame image of the first field of view image (for example, an image of a previous frame of the first field of view image or one of images of several previous frames of the first field of view image), divide the first field of view image into several pixel blocks, and search for a location of each pixel block in the adjacent-frame image of the first field of view image, to calculate a relative offset of space locations of a same pixel block from the adjacent-frame image of the first field of view image to the first field of view image. Relative offsets of the pixel blocks may constitute the motion vector of the first field of view image.

After obtaining the first field of view image and the depth information and the motion vector of the first field of view image, the cloud device may use some or all of the foregoing information as information about the first field of view image, and then send the information about the first field of view image to the terminal device.

Optionally, to efficiently send the information about the first field of view image to the terminal device, the cloud device may perform code compression on the first field of view image, to occupy fewer resources during data transmission, thereby improving data transmission efficiency.

An encoder may be deployed in the cloud device, and is configured to implement code compression on the first field of view image.

Because there is a specific correspondence between the first field of view image and the depth information and the motion vector of the first field of view image, the cloud device may encapsulate the information about the first field of view image, and then send the encapsulated information about the first field of view image to the terminal device.

Step 303: The cloud device sends the information about the first field of view image to the terminal device. The first field of view image is a field of view image corresponding to the posture and the location of the terminal device at the first moment.

An encapsulation and stream pushing module may be deployed in the cloud device, and is configured to encapsulate the information about the first field of view image. The encapsulation and stream pushing module in the cloud device may further push the encapsulated information about the first field of view image to the terminal device.

In a possible implementation, the information about the first field of view image may further include information about the posture and the location of the terminal device at the first moment, so that after receiving the information about the first field of view image, the terminal device may clearly determine that the first field of view image is a field of view image corresponding to the posture and the location of the terminal device at the first moment.

Alternatively, the information about the first field of view image may not carry the information about the posture and the location of the terminal device at the first moment. When the terminal device sends the first information to the cloud device, the terminal device may store the information about the posture and the location of the terminal device at the first moment. When receiving the information about the first field of view image, the terminal device may locally obtain the information about the posture and the location of the terminal device at the first moment.

It should be noted that, when the cloud device receives information from the terminal device at a frequency, the first information sent by the terminal device is not necessarily received by the cloud device. In other words, a time point at which the terminal device sends the first information does not reach a time point at which the cloud device receives information. To enable the terminal device to determine, when the information about the first field of view image does not carry the information about the posture and the location of the terminal device at the first moment, that the first field of view image is a field of view image corresponding to the posture and the location of the terminal device at the first moment, when successfully receiving the first information, the cloud device may send a response message to the terminal device, to notify the terminal device that the terminal device has successfully received the first information. After receiving the response message, the terminal device stores the information about the posture and the location of the terminal device at the first moment. Alternatively, the terminal device may send the first information to the cloud device at the frequency at which the cloud device receives information or a frequency at which the cloud device updates a locally stored posture and location of the terminal device. In other words, the cloud device can receive the first information sent by the terminal device, and can render the prestored environment image of the terminal device based on the posture and the location of the terminal device at the first moment, to obtain the first field of view image. In this way, when the cloud device delivers the information about the first field of view image to the terminal device, the terminal device can determine the posture and the location that are of the terminal device at the first moment and that correspond to the first field of view image.

The manner in which the terminal device obtains the posture and the location of the terminal device at the first moment is merely an example for description. Any manner in which when receiving the information about the first field of view image, the terminal device can determine that the information about the first field of view image is a field of view image corresponding to the posture and the location of the terminal device at the first moment is applicable to this embodiment.

Step 304: After the terminal device receives the information about the first field of view image from the cloud device, the terminal device displays the image within the field of view range of the terminal device at the second moment based on the information about the first field of view image and a posture change and a location change of the terminal device from the first moment to the second moment. The second moment is later than the first moment.

If the cloud device encapsulates the information about the first field of view image, the terminal device needs to decapsulate the encapsulated information about the first field of view image.

To be specific, a decapsulation module may be deployed in the terminal device, and is configured to decapsulate the received encapsulated information about the first field of view image, to obtain the information about the first field of view image.

If the cloud device performs code compression on the first field of view image, the terminal device further needs to decode the first field of view image obtained through the code compression, to obtain the first field of view image.

A posture and a location of the terminal device may change from a moment at which the terminal device sends the first information to the cloud device to a moment at which the terminal device receives the information about the first field of view image. In other words, a posture and a location of the terminal device have changed from the posture and the location at the first moment to a posture and a location at the second moment.

To ensure that the terminal device can correctly display an image and shorten a display latency, the terminal device should display the image within the field of view range of the terminal device at the second moment. To correctly display the image, the terminal device needs to use the posture and the location of the terminal device at the second moment and the received information about the first field of view image.

First, the terminal device needs to obtain the posture and the location of the terminal device at the second moment. For example, the terminal device may obtain the posture and the location of the terminal device at the second moment by using the tracker or the sensor. A manner in which the terminal device needs to obtain the posture and the location of the terminal device at the second moment is the same as a manner in which the terminal device needs to obtain the posture and the location of the terminal device at the first moment. For details, refer to the foregoing content. Details are not described herein again.

In addition to obtaining the posture and the location of the terminal device at the second moment, the terminal device further needs to determine the posture and the location of the terminal device at the first moment. For a manner in which the terminal device determines the posture and the location of the terminal device at the first moment, refer to the description in step 303. Details are not described herein again.

After determining the posture and the location of the terminal device at the second moment and the posture and the location of the terminal device at the first moment, the terminal device may determine the posture change and the location change of the terminal device from the first moment to the second moment.

The terminal device may learn of the posture change and the location change of the terminal device from the first moment to the second moment, to be specific, may determine a rotation status change and a space location change of the terminal device from the first moment to the second moment.

Then, the terminal device may convert the first field of view image into a second field of view image based on the location change of the terminal device from the first moment to the second moment. The second field of view image is a field of view image corresponding to the posture and the location of the terminal device at the second moment.

After learning of the location change of the terminal device from the first moment to the second moment, the terminal device may move the materials displayed in the first field of view image, to obtain the second field of view image. Because the field of view range of the first field of view image is greater than the field of view range of the terminal device, the second field of view image obtained after the first field of view image is rotated and moved corresponds to the location of the terminal device at the second moment, and a field of view range of the second field of view image is consistent with the field of view range of the first field of view image, and is greater than the field of view range of the terminal device at the second moment.

It should be understood that, because the field of view range of the first field of view image extends from the field of view range of the terminal device, during extending, an extended range may be determined with reference to a maximum range in which the terminal device can move from the first moment to the second moment. This can ensure that the second field of view image can cover images in all possible field of view ranges of the terminal device at the second moment after the first field of view image is converted into the second field of view image.

The field of view range of the first field of view image may be preset. When presetting the field of view range of the first field of view image, the cloud device estimates a time period from a moment at which information from the terminal device is received to a moment at which information about a field of view image is output, determines a possible movement range of the terminal device based on the estimated time, and then determines the field of view range of the first field of view image.

Optionally, if the field of view range of the first field of view image is greater than the field of view range of the terminal device at the first moment, because the field of view range of the first field of view image is larger, the second field of view image can better cover images in all the possible field of view ranges of the terminal device at the second moment, and the terminal device can more accurately display the image within the field of view range of the terminal device at the second moment, to improve user experience.

After the terminal device obtains the second field of view image through conversion, the terminal device may determine the image within the field of view range of the terminal device from the second field of view image, and then may display the image within the field of view range of the terminal device in the second field of view image.

For example, when converting the first field of view image into the second field of view image, the terminal device needs to first obtain depth information of the second field of view image and pixel change information for converting the first field of view image into the second field of view image.

The pixel change information for converting the first field of view image into the second field of view image is a change of relative locations of any pixel in the first field of view image before and after the first field of view image is converted into the second field of view image. Because pixels usually change in blocks, the pixel change information may be a change of relative locations of each pixel block in the first field of view image before and after the conversion.

Then, the terminal device adjusts the first field of view image based on the depth information of the second field of view image and the pixel change information to convert the first field of view image into the second field of view image.

For example, the following two operations are included:

1. The terminal device may adjust the depth information of the first field of view image based on the depth information of the second field of view image, and adjust the distances from the materials displayed in the first field of view image to the terminal device.

2. The terminal device adjusts locations of the pixels in the first field of view image based on the pixel change information.

The foregoing two operations may be performed at the same time, or may be performed in sequence. A performing sequence is not limited in this embodiment.

The following describes a manner in which the terminal device obtains the depth information of the second field of view image and the pixel change information.

1. The depth information of the second field of view image.

The terminal device determines the depth information of the second field of view image based on the depth information in the information about the first field of view image and the location change of the terminal device from the first moment to the second moment.

For example, because depth information of a field of view image is related to a location of the terminal device, the terminal device may determine the location change of the terminal device from the first moment to the second moment, then may determine the depth information of the second field of view image based on the depth information in the information about the first field of view image, and may further determine blocking statuses of materials that should be displayed in the second field of view image.

The depth information of the second field of view image is used to indicate a distance from each material (an image such as a person, an object, or a background) displayed in the second field of view image to the camera (The camera is abstracted from the terminal device. For specific descriptions, refer to the related description of the camera in the depth information of the first field of view image. Details are not described herein again). For example, the second field of view image includes a figure B, the depth information includes a distance from the figure B to the terminal device.

Optionally, the depth information of the second field of view image may be a depth map of the second field of view image.

2. The pixel change information.

The terminal device determines the pixel change information based on the motion vector and the location change of the terminal device from the first moment to the second moment.

For example, because a pixel change is caused by a location change of the terminal device, the terminal device may determine the location change of the terminal device from the first moment to the second moment, and then may determine the pixel change information based on a location of each pixel in the information about the first field of view image and the motion vector.

Because the materials displayed in the first field of view image are located at different locations, some blocked areas exist. Whether these blocked areas are visible after the first field of view image is converted into the second field of view image may be determined based on the depth information of the second field of view image and the pixel change information. A blocked part that is visible after the conversion needs to be recovered, to be specific, pixel interpolation processing needs to be performed to display an image.

After the second field of view image is determined based on the depth information and the pixel change information at the second moment, the image within the field of view range of the terminal device in the second field of view image may be displayed based on the posture change of the terminal device from the first moment to the second moment.

The terminal device may determine a change of the field of view range of the terminal device from the first moment to the second moment based on the posture change of the terminal device from the first moment to the second moment, and then may display the image within the field of view range of the terminal device in the second field of view image based on the change of the field of view range of the terminal device.

For example, because the field of view range of the second field of view image is greater than the field of view range of the terminal device at the second moment, to display the image within the field of view range of the terminal device at the second moment, the terminal device needs to determine the field of view range of the terminal device at the second moment.

For example, the terminal device determines the field of view range of the terminal device at the second moment based on the posture of the terminal device at the second moment.

Because a posture of the terminal device affects a field of view range of the terminal device, the terminal device may determine the posture of the terminal device at the second moment, and then may determine the field of view range of the terminal device at the second moment based on the posture of the terminal device at the second moment.

In a process of converting the first field of view image into the second field of view image, only a location change of the terminal device is considered. To finally display the image of the terminal device within the field of view range at the second moment, the change of the field of view range from the first moment to the second moment can be determined based on the posture change of the terminal device from the first moment to the second moment, and then the field of view range of the terminal device at the second moment can be determined. Based on the second field of view image, the image of the terminal device within the field of view range at the second moment may be determined based on the field of view range of the terminal device at the second moment, and then the image within the field of view range of the terminal device at the second moment may be displayed.

In this embodiment, after receiving the field of view image corresponding to the posture and the location of the terminal device at the first moment, the terminal device may display the image within the field of view range of the terminal device at the second moment based on the posture change and the location change from the first moment to the second moment. Compared with an existing serial display solution, a display latency can be effectively shortened, and better user experience can be ensured.

The following further describes, with reference to specific data, a process in which the terminal device determines the image within the field of view range of the terminal device at the second moment.

A quaternion (rX, rY, rZ, w) represents a posture of the terminal device. rX, rY, and rZ respectively represent components of a rotation axis on an x-axis, a y-axis, and a z-axis when the terminal device rotates, and w represents an angle for rotating along the rotation axis. (pX, pY, pZ) represents location information of the terminal device, and pX, pY, pZ respectively represent components of a location of the terminal device on the x-axis, the y-axis, and the z-axis.

It is assumed that an image matrix of the first field of view image is S, the posture of the terminal device at the first moment is $R_s=(rX_s, rY_s, rZ_s, w_s)$, the location of the terminal device at the first moment is $P_s=(pX_s, pY_s, pZ_s)$, the depth information of the first field of view image is $D_s$, the motion vector is $M_s$, both $D_s$ and $M_s$ are matrices, the posture of the terminal device at the second moment is $R_t=(rX_t, rY_t, rZ_t, w_t)$, the location of the terminal device at the second moment is $P_t=(pX_t, pY_t, pZ_t)$, and an image matrix of the image within the field of view range of the terminal device at the second moment is T.

First, the second field of view image is obtained based on the location change ΔP of the terminal device, the first field of view image, the depth information $D_s$ of the first field of view image, and the motion vector $M_s$.

The steps are included:

Step 1: Calculate the location change ΔP of the terminal device from the first moment to the second moment, where $\Delta P = P_t - P_s$.

Step 2: Determine three-dimensional coordinates $P_{pixel}=(PX_{pixel}, PY_{pixel}, PZ_{pixel})$ of a pixel in the first field of view image based on the depth information $D_s$ of the first field of view image. A depth value $d_t = \|P_t - P_{pixel}\|$ of each pixel $P_{pixel}$ in the second field of view image may be determined based on the location change of the terminal. In other words, the depth information $D_t$ of the second field of view image may be determined.

Step 3: Determine the pixel change information $M_S \cdot (\Delta P/\Delta P')$ based on the motion vector $M_S$ and the location change $\Delta P$ of the terminal device. $\Delta P'$ is a change from a location of the terminal device corresponding to an adjacent image of the first field of view image to the location of the terminal device at the first moment.

Step 4: Adjust the pixels in the first field of view image to obtain a pixel-adjusted image matrix $T_0$, where $$S \xrightarrow{M_S \cdot (\Delta P/\Delta P')} T_0.$$

Step 5: Adjust the pixel-adjusted image matrix $T_0$ based on the depth information $D_t$ of the second field of view image, to finally obtain an image matrix $T_0$ of the second field of view image.

After the second field of view image is obtained through conversion, the image within the field of view range of the terminal device at the second moment is determined.

For example, the posture change $\Delta R$ of the terminal device from the first moment to the second moment is calculated, where $\Delta R = R_t - R_s$, and $\Delta R$ is converted into a rotation matrix $\Delta R_r$.

The image matrix T of the image within the field of view range of the terminal device at the second moment is obtained based on the rotation matrix $\Delta R_r$, where $T_0 \cdot \Delta R_r \rightarrow T$.

Figure 5A:
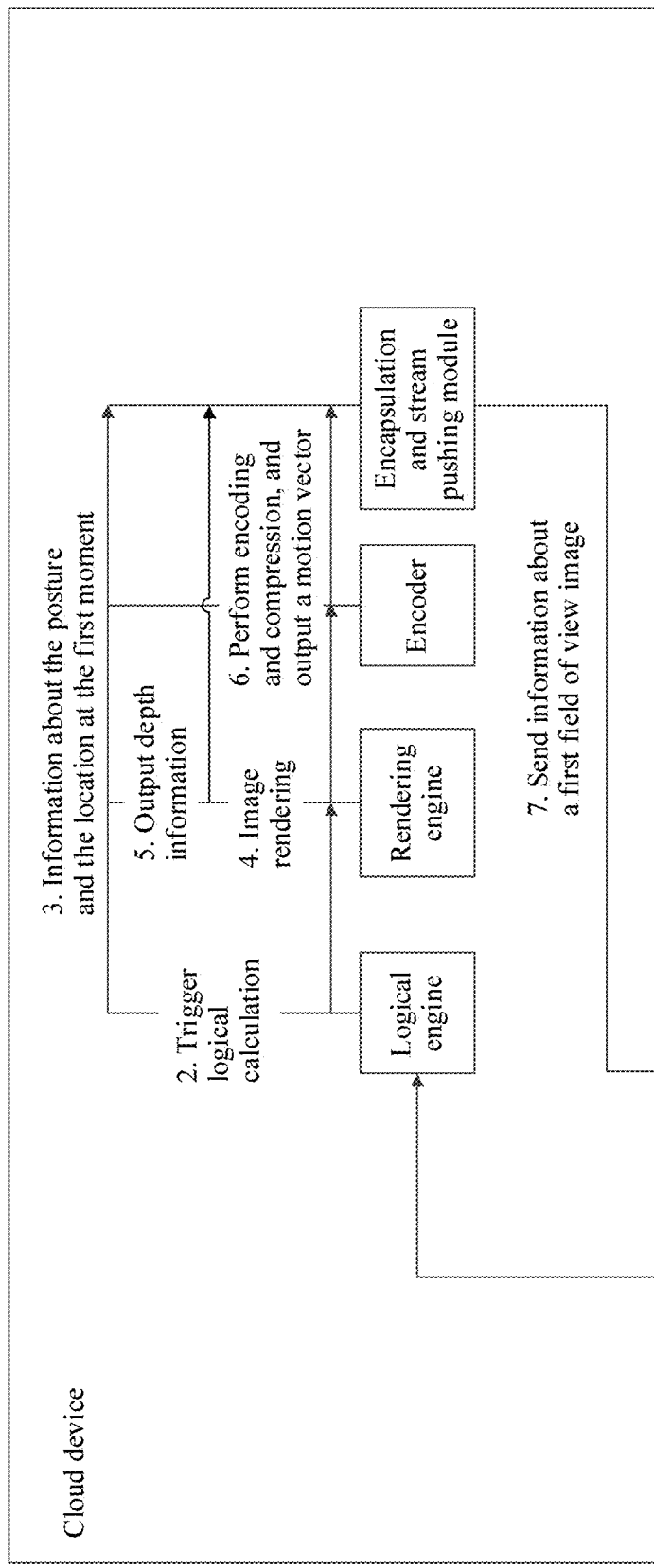
FIG. 5A and FIG. 5B are a flowchart of an image display method.
Figure 5B:
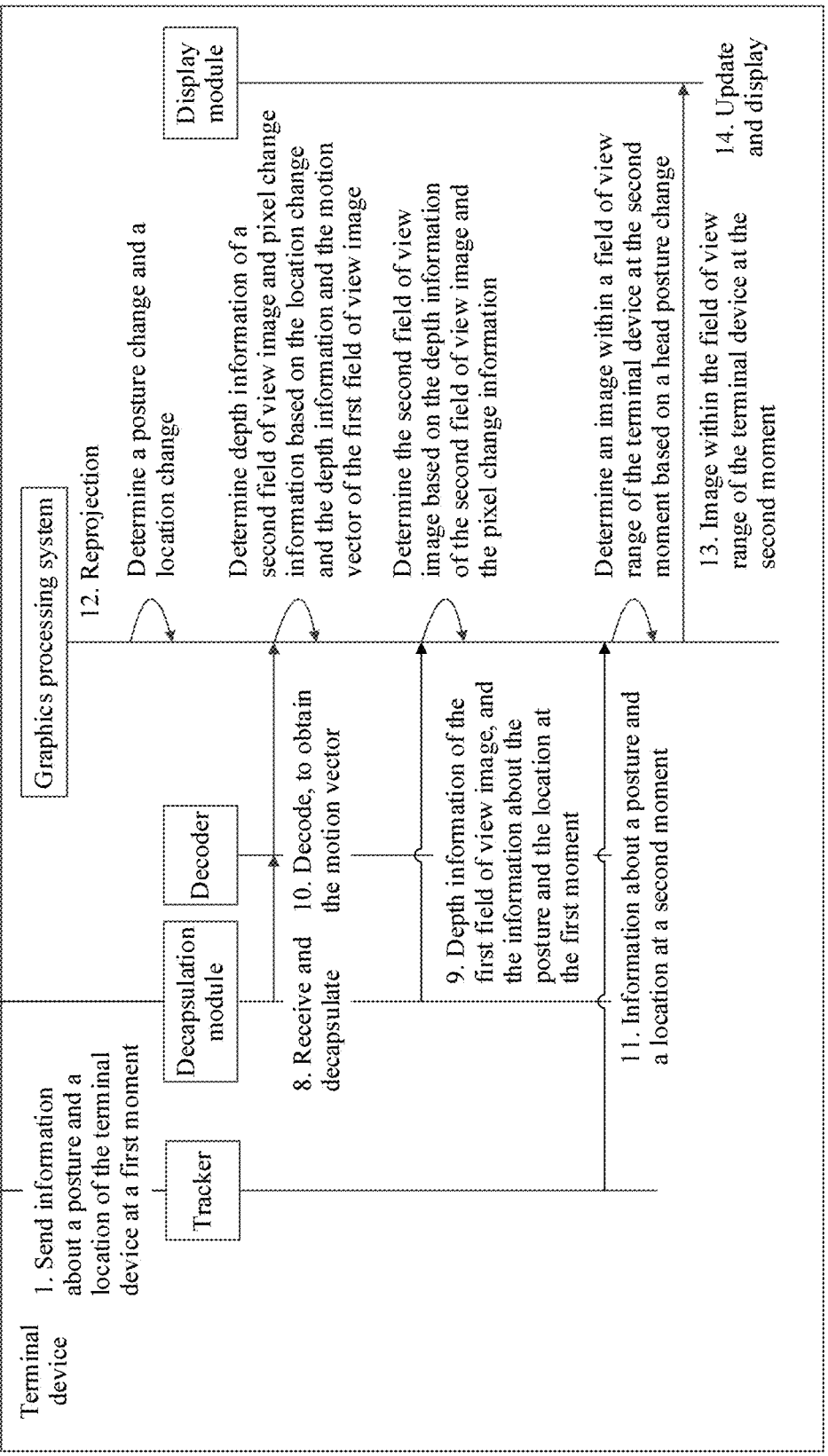

FIG. 5A and FIG. 5B are a flowchart of an image display method according to an embodiment.

Step 501: First, after capturing a posture and a location of a terminal device at a first moment, a tracker in the terminal device uploads information about the posture and the location of the terminal device at the first moment to a cloud device (this may be considered as sending first information).

Step 502: The cloud device periodically receives information from the terminal device, receives, at a receiving time point, the information about the posture and the location of the terminal device at the first moment, and triggers a logical engine in the cloud device to perform a logical operation.

Step 503: Then, the logical engine sends data obtained through the logical operation to a rendering engine in the cloud device, and sends the information about the posture and the location of the terminal device at the first moment to an encapsulation and stream pushing module in the cloud device.

Step 504: The rendering engine in the cloud device performs a rendering operation to obtain a first field of view image. The first field of view image includes an image within a field of view range of the terminal device at the first moment, and a field of view range of the first field of view image is greater than the field of view range of the terminal device at the first moment.

Step 505: The rendering engine in the cloud device generates depth information of the first field of view image in a rendering process, and the rendering engine in the cloud device sends the first field of view image to an encoder in the cloud device, and sends the depth information of the first field of view image to the encapsulation and stream pushing module in the cloud device.

Step 506: The encoder in the cloud device performs code compression on the first field of view image, outputs a motion vector, and sends the motion vector and the first field of view image obtained through the code compression to the encapsulation and stream pushing module in the cloud device.

Step 507: After receiving the information about the posture and the location of the terminal device at the first moment, the first field of view image obtained through the code compression, the depth information of the first field of view image, and the motion vector, the encapsulation and stream pushing module in the cloud device uses the information about the posture and the location of the terminal device at the first moment, the first field of view image obtained through code compression, the depth information of the first field of view image, and the motion vector as information about the first field of view image, encapsulates the information, and sends the encapsulated information about the first field of view image to the terminal device.

Step 508: The terminal device receives the encapsulated information about the first field of view image, and the encapsulated information about the first field of view image arrives at a decapsulation module in the terminal device. The decapsulation module in the terminal device decapsulates the encapsulated information about the first field of view image, to obtain the information about the first field of view image, and sends the information about the first field of view image to a decoder in the terminal device.

Step 509: The decapsulation module in the terminal device sends the information about the posture and the location of the terminal device at the first moment and the depth information of the first field of view image to a graphics processing system in the terminal device.

Step 5010: The decoder decodes the first field of view image obtained through the code compression to obtain the first field of view image, outputs the motion vector, and sends the first field of view image and the motion vector to the graphics processing system in the terminal device.

Step 5011: Currently, at a second moment, after capturing a posture and a location of the terminal device at the second moment, the tracker in the terminal device sends information about the posture and the location of the terminal device at the second moment to the graphics processing module in the terminal device.

Step 5012: In the graphics processing system in the terminal device, the graphics processing system determines a posture change and a location change of the terminal device from the first moment to the second moment based on the posture and the location of the terminal device at the first moment and the posture and the location of the terminal device at the second moment; determines, based on the location change of the terminal device from the first moment to the second moment, the depth information of the first field of view image, and the motion vector, depth information of a second field of view image and pixel change information for converting the first field of view image into the second field of view image; converts the first field of view image into the second field of view image based on the depth information of the second field of view image and the pixel change information; and determines a field of view range of the terminal device at the second moment based on the posture change of the terminal device from the first moment to the second moment, and further determines an image within the field of view range of the terminal device in the second field of view image.

Step 5013: The graphics processing system in the terminal device sends the image within the field of view range of the terminal device in the second field of view image to a display module in the terminal device.

Step 5014: The display module in the terminal device displays the image within the field of view range of the terminal device in the second field of view image.

It should be noted that, in the graphics processing system in the terminal device, the graphics processing system determines the image within the field of view range of the terminal device at the second moment based on the information about the first field of view image and the posture change and the location change of the terminal device from the first moment to the second moment. In other words, the first field of view image is reprojected, to obtain the image within the field of view range of the terminal device at the second moment. For ease of understanding, an operation process of the graphics processing system in the terminal device is referred to as reprojection.

To measure a display latency in a VR technology, a concept of a motion-to-photon (MTP) latency is introduced. The MTP latency is a time difference from a movement of the terminal device worn by a user (the posture change and the location change of the terminal device) to a change of an image viewed by the user. When the MTP latency is not greater than 20 milliseconds (ms), a motion sickness caused by mismatch between motion and perception can be better avoided.

According to the image display method provided in this embodiment, a display latency can be effectively shortened. In other words, an MTP latency in the cloud VR solution can be effectively optimized, so that a problem of the motion sickness of the user easily caused in the cloud VR solution can be better resolved.

For example, an estimated sum of a latency of capturing a posture and a location of the terminal device by the terminal device, a latency of uploading the posture and the location of the terminal device by the terminal device to the cloud device, and a latency of rendering image data and delivering image data by the cloud device to the terminal device is 30 ms to 50 ms, and an image display frame rate of the terminal device is 90 Hz. If an existing serial mode of rendering by the cloud device and displaying by terminal device is used, an estimated MTP latency in the existing cloud VR solution is 36 ms to 68 ms. In other words, for a moment, an estimated latency from the moment at which a posture and a location of the terminal device change to a moment at which the terminal device receives and displays an image of the terminal device at the moment is 36 ms to 68 ms, including a latency of capturing a posture and a location of the terminal device by the terminal device, a latency of uploading the posture and the location of the terminal device to the cloud device by the terminal device, a latency of rendering and delivering an image by the cloud device, and an estimated latency 6 ms to 18 ms of displaying an image by the terminal device. However, according to the image display method provided in this embodiment, a process in which the cloud device renders and delivers the information about the first field of view image and a process in which the terminal device displays the image are performed in parallel, and the cloud device cooperates with the terminal device. An MTP latency in a cloud VR solution to which the image display method provided in this embodiment is applied is irrelevant to the latency of capturing a posture and a location of the terminal device by the terminal device, the latency of uploading the posture and the location of the terminal device to the cloud device by the terminal device, and the latency of rendering and delivering an image by the cloud device, and is related only to the terminal device. When the posture and the location of the terminal device at the first moment change, the terminal device uploads the posture and the location at the first moment to the cloud device. Based on a field of view image at the first moment that is obtained from the cloud device, the terminal device displays an image within the field of view range of the terminal device at the second moment after the first moment, instead of an image within the field of view range of the terminal device at the first moment, to shorten a time period from the second moment at which the posture and the location of the terminal device change to a moment for displaying the image of the terminal device within the field of view range at the second moment. In other words, for a moment, a latency from the moment at which a posture and a location of the terminal device change to a moment for displaying an image within a field of view range of the terminal device at the moment is shortened. In this case, the MTP latency in the cloud VR solution is effectively shortened, and an estimated MTP latency is 10 ms to 25 ms, including an estimated latency 1 ms of capturing a posture and a location of the terminal device, an estimated latency 3 ms to 5 ms of reprojection, and an estimated latency 6 ms to 18 ms of updating a displayed image.

Based on a same concept as the method embodiments, an embodiment provides an apparatus 600. The apparatus 600 is configured to implement the method performed by the terminal device in the foregoing method embodiments. The apparatus is in a structure shown in FIG. 6, and includes a sending unit 601, a receiving unit 602, and a display unit 603.

The sending unit 601 is configured to send first information to a cloud device, where the first information is used to indicate a posture and a location of a terminal device at a first moment.

The receiving unit 602 is configured to receive information about a first field of view image from the cloud device, where the first field of view image is a field of view image corresponding to the posture and the location of the terminal device at the first moment.

The display unit 603 is configured to display an image within a field of view range of the terminal device at a second moment based on the information about the first field of view image and a posture change and a location change of the terminal device from the first moment to the second moment, where the second moment is later than the first moment.

In a possible implementation, the receiving unit 602 may include a decapsulation unit (or may be referred to as a decapsulation module). The cloud device encapsulates the information about the first field of view image, and the decapsulation unit needs to decapsulate the encapsulated information about the first field of view image.

To display the image within the field of view range of the terminal device at the second moment, the display unit 603 first needs to convert the first field of view image. A specific process is as follows:

The information about the first field of view image needs to include the first field of view image. The display unit 603 may convert the first field of view image into a second field of view image based on the location change of the terminal device from the first moment to the second moment. The second field of view image is a field of view image corresponding to a posture and a location of the terminal device at the second moment.

Then, the display unit 603 displays the image within the field of view range of the terminal device in the second field of view image based on the posture change of the terminal device from the first moment to the second moment.

When converting the first field of view image into the second field of view image, the display unit 603 needs to determine two parameters based on the location change of the terminal device from the first moment to the second moment. The two parameters are depth information of the second field of view image and pixel change information for converting the first field of view image into the second field of view image.

The display unit 603 may determine, based on the location change of the terminal device from the first moment to the second moment, the depth information of the second field of view image and the pixel change information for converting the first field of view image into the second field of view image. Then, the display unit 603 converts the first field of view image into the second field of view image based on the depth information of the second field of view image and the pixel change information.

In a possible implementation, a manner in which the display unit 603 determines the depth information of the second field of view image and the pixel change information for converting the first field of view image into the second field of view image is as follows:

The information about the first field of view image further includes depth information, and the display unit 603 determines the depth information of the second field of view image based on the depth information in the information about the first field of view image and the location change of the terminal device from the first moment to the second moment.

The information about the first field of view image further includes a motion vector, the motion vector is used to represent change trends of pixels in the first field of view image, and the display unit 603 determines the pixel change information based on the motion vector and the location change of the terminal device from the first moment to the second moment.

For example, the first field of view image may include an image within a field of view range of the terminal device at the first moment, and a field of view range of the first field of view image further needs to be greater than the field of view range of the terminal device at the first moment, to ensure that the first field of view image can cover as many images as possible in all possible field of view ranges of the terminal device at the second moment.

Before displaying the image within the field of view range of the terminal device at the second moment, the display unit 603 needs to determine the field of view range of the terminal device at the second moment based on the posture of the terminal device at the second moment, to determine, from the second field of view image, the image within the field of view range of the terminal device at the second moment.

Optionally, the display unit 603 may include a decoding unit. For example, the decoding unit may be a decoder. The decoding unit is configured to decode the first field of view image obtained through code compression.

The display unit 603 may further include a graphics processing unit configured to perform reprojection based on the information about the first field of view image, to obtain the image within the field of view range of the terminal device at the second moment. The graphics processing unit is configured to implement the method performed by the graphics processing system in the method embodiment. For details, refer to the foregoing content. Details are not described herein again.

Based on a same concept as the method embodiments, an embodiment provides an apparatus 700. The apparatus 700 is configured to implement the method performed by the cloud device in the foregoing method embodiments. The apparatus is in a structure shown in FIG. 7, and includes a receiving unit 701, a processing unit 702, and a sending unit 703.

The receiving unit 701 is configured to receive first information from a terminal device, where the first information is used to indicate a posture and a location of the terminal device at a first moment.

The processing unit 702 is configured to render a prestored environment image of the terminal device based on the first information, to obtain a first field of view image, where the first field of view image is a field of view image corresponding to the posture and the location of the terminal device at the first moment.

The sending unit 703 is configured to send information about the first field of view image to the terminal device.

In a possible implementation, the sending unit 703 may include an encapsulation and stream pushing unit (or may be referred to as an encapsulation and stream pushing module), and the encapsulation and stream pushing module is configured to encapsulate the information about the first field of view image, and may send the encapsulated information about the first field of view image to the terminal device.

Optionally, the information about the first field of view image includes the first field of view image. The information about the first field of view image may further include depth information and a motion vector.

The first field of view image includes an image within a field of view range of the terminal device at the first moment, and a field of view range of the first field of view image is greater than the field of view range of the terminal device at the first moment.

Optionally, the processing unit 702 may include a logical operation unit. For example, the logical operation unit may be a logical engine. The logical operation unit is configured to perform a logical operation based on the first information, to obtain status information of an image that needs to be displayed by the terminal device at the first moment.

The processing unit 702 may further include an image rendering unit. For example, the image rendering unit may be a rendering engine. The image rendering unit is configured to render the prestored environment image of the terminal device to obtain the first field of view image. For example, the image rendering unit may render the prestored environment image of the terminal device based on the status information, that is output by the logical operation unit, of the image that needs to be displayed by the terminal device at the first moment, to obtain the first field of view image.

In a possible implementation, the processing unit 702 may further include an encoding unit. For example, the encoding unit may be an encoder. The encoding unit is configured to implement code compression on the first field of view image.

Division into the units in this embodiment is an example and is merely logical function division. In actual implementation, another division manner may be used. In addition, function units in this embodiment may be integrated in one processor, or may exist alone physically, or two or more units may be integrated into one module. The integrated unit may be implemented in a form of hardware, or may be implemented in a form of a software function module.

When the integrated unit is implemented in the form of a software function unit and sold or used as an independent product, the integrated unit may be stored in a computer readable storage medium. Based on such an understanding, the technical solutions of this disclosure may be implemented in the form of a software product. The computer software product is stored in a storage medium and includes several instructions for instructing a terminal device (which may be a personal computer, a mobile phone, a network device, or the like) or a processor to perform all or some of the steps of the methods in the embodiments. The foregoing storage medium includes any medium that can store program code, such as a USB flash drive, a removable hard disk, a read-only memory (ROM), a random-access memory (RAM), a magnetic disk, or an optical disc.

In the embodiments, both the cloud device and the terminal device may be divided into function modules through integration. The "module" herein may be a specific ASIC, a circuit, a processor executing one or more software or firmware programs, a memory, an integrated logical circuit, and/or another device that can provide the foregoing functions.

Figure 8:
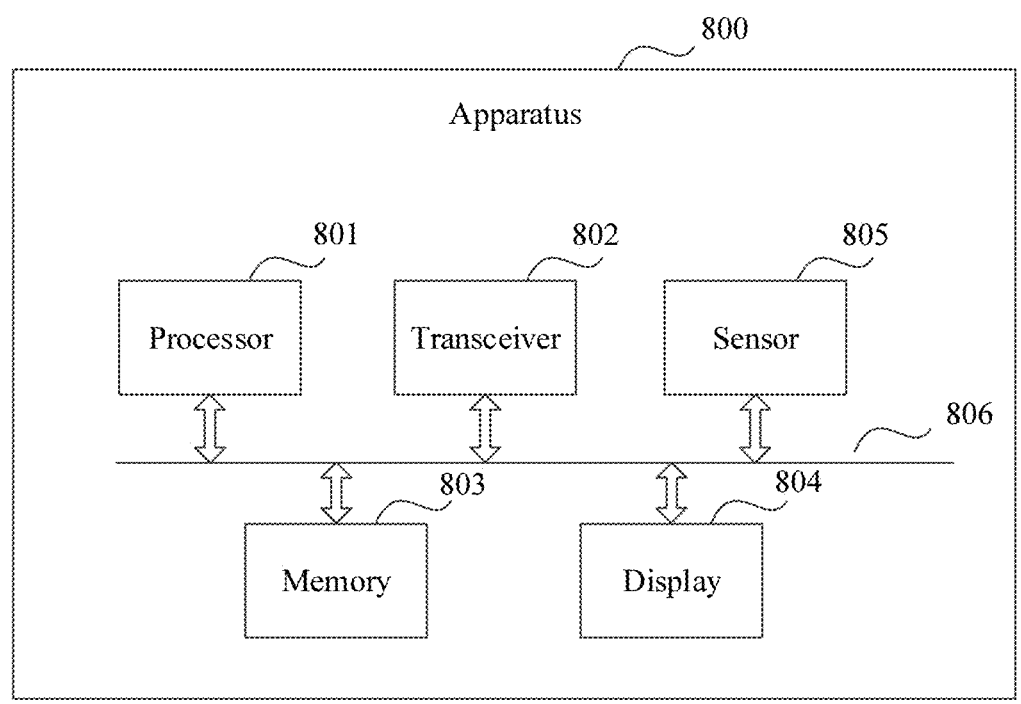

In a simple embodiment, a person skilled in the art may figure out that the terminal device may be in a form shown in FIG. 8.

An apparatus 800 shown in FIG. 8 includes at least one processor 801 and a transceiver 802, and optionally, may further include a memory 803.

In one possible embodiment, the device 800 may further include a display 804, and the device may further include a sensor 805 configured to capture a posture and a location of the terminal device.

The memory 803 may be a volatile memory such as a RAM. Alternatively, the memory may be a non-volatile memory such as a read-only memory, a flash memory, a hard disk drive (HDD), or a solid-state drive (SSD). Alternatively, the memory 803 is any other medium that can be used to carry or store expected program code in a command or data structure form and that can be accessed by a computer. However, this is not limited. The memory 803 may be a combination of the foregoing memories.

In this embodiment, a specific connection medium between the processor 801 and the memory 803 is not limited. In this embodiment, the memory 803 and the processor 801 are connected by using a bus 806 in the figure. The bus 806 is indicated by using a bold line in the figure. A manner of connection between other components is merely an example for description, and is not limited thereto. The bus 806 may be classified into an address bus, a data bus, a control bus, and the like. For ease of representation, the bus is represented by using only one bold line in FIG. 8, but this does not mean that there is only one bus or only one type of bus.

The processor 801 may have data receiving and sending functions, and can communicate with another device. For example, in this embodiment, the processor 801 may send first information to a cloud device, or may receive information about a first field of view image from the cloud device. In the apparatus shown in FIG. 8, an independent data transceiver module such as the transceiver 802 may be disposed, and is configured to receive and send data. When communicating with another device, the processor 801 may transmit data through the transceiver 802. For example, in this embodiment, the processor 801 may send the first information to the cloud device through the transceiver 802, or may receive the information about the first field of view image from the cloud device through the transceiver 802.

When the terminal device is in a form shown in FIG. 8, the processor 801 in FIG. 8 may invoke a computer executable instruction stored in the memory 803, so that the terminal device can perform the method performed by the terminal device in any one of the foregoing method embodiments.

Figure 6:
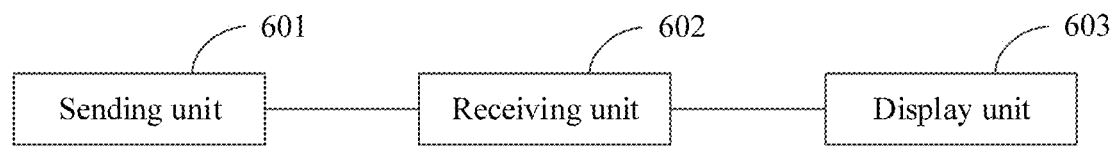
FIG. 6 to FIG. 9 are schematic structural diagrams of an apparatus.

For example, the memory 803 stores a computer executable instruction used to implement functions of the sending unit, the receiving unit, and the display unit in FIG. 6. All functions/implementation processes of the sending unit, the receiving unit, and the display unit in FIG. 6 may be implemented by the processor 801 in FIG. 8 by invoking the computer executable instruction stored in the memory 803.

Alternatively, the memory 803 stores a computer executable instruction used to implement a function of the display unit in FIG. 6. A function/implementation process of the display unit in FIG. 6 may be implemented by the processor 801 in FIG. 8 by invoking the computer executable instruction stored in the memory 803. Functions/implementation processes of the sending unit and the receiving unit in FIG. 6 may be implemented by the transceiver 802 in FIG. 8.

When the processor 801 performs a function of the display unit, for example, an image display operation, for example, displays an image within a field of view range of the terminal device at a second moment, the processor 801 may display the image through the display 804 in the apparatus 800. To be specific, the processor 801 may display the image within the field of view range of the terminal device at the second moment through the display 804 based on the information about the first field of view image and a posture change and a location change of the terminal device from a first moment to the second moment.

Optionally, when performing the function of the display unit, the processor 801 may alternatively display an image through a display in another device, for example, send a display instruction to the another device to instruct to display an image. To be specific, the processor 801 may display the image within the field of view range of the terminal device at the second moment through the display in the another device based on the information about the first field of view image and a posture change and a location change of the terminal device from the first moment to the second moment.

Figure 9:
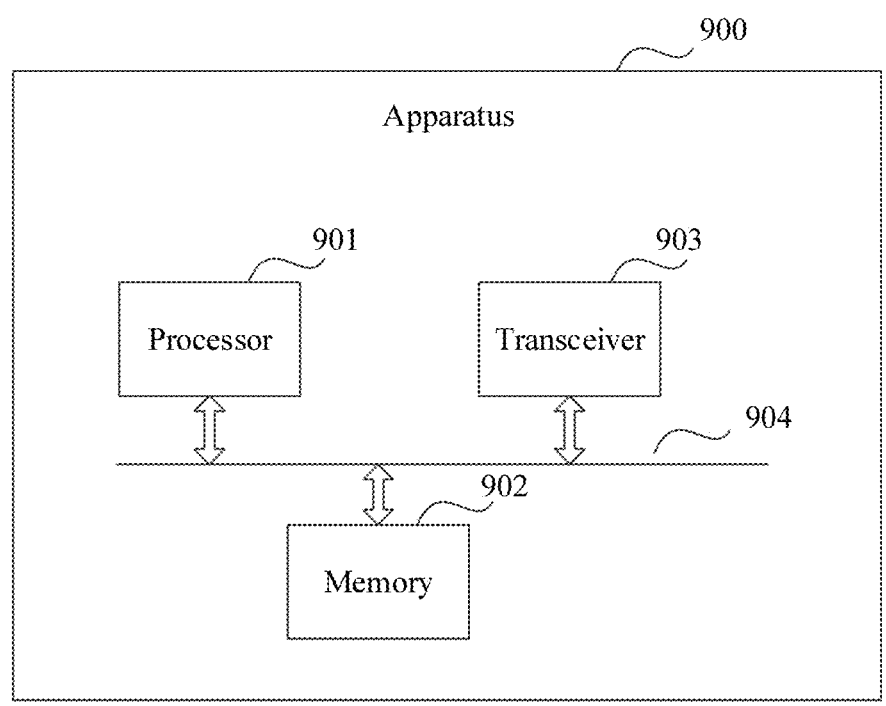

In a simple embodiment, a person skilled in the art may figure out that the cloud device may be in a form shown in FIG. 9.

A communications apparatus 900 shown in FIG. 9 includes at least one processor 901, and optionally, may further include a memory 902 and a transceiver 903.

The memory 902 may be a volatile memory such as a random access memory. Alternatively, the memory may be a non-volatile memory such as a read-only memory, a flash memory, a hard disk drive, or a solid-state drive. Alternatively, the memory 902 is any other medium that can be used to carry or store expected program code in a command or data structure form and that can be accessed by a computer. However, this is not limited. The memory 902 may be a combination of the foregoing memories.

In this embodiment, a specific connection medium between the processor 901 and the memory 902 is not limited. In this embodiment, the memory 902 and the processor 901 are connected by using a bus 904 in the figure. The bus 904 is indicated by using a bold line in the figure. A manner of connection between other components is merely an example for description, and is not limited thereto. The bus 904 may be classified into an address bus, a data bus, a control bus, and the like. For ease of representation, the bus is represented by using only one bold line in FIG. 9, but this does not mean that there is only one bus or only one type of bus.

The processor 901 may have data receiving and sending functions, and can communicate with another device. In the apparatus shown in FIG. 9, an independent data transceiver module may alternatively be disposed. For example, the transceiver 903 is configured to receive and send data. When the processor 901 communicates with another device, data may be transmitted through the Transceiver 903.

When the cloud device is in a form shown in FIG. 9, the processor 901 in FIG. 9 may invoke a computer executable instruction stored in the memory 902, so that the cloud device can perform the method performed by the cloud device in any one of the foregoing method embodiments.

Figure 7:
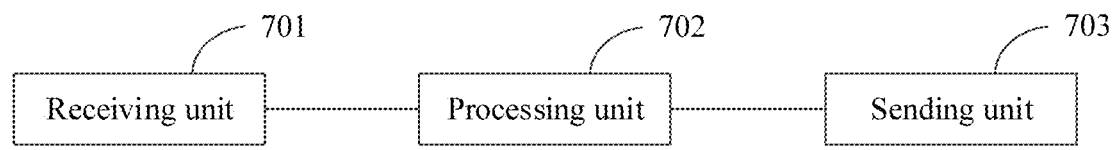

For example, the memory 902 stores a computer executable instruction used to implement functions of the sending unit, the receiving unit, and the processing unit in FIG. 7. All functions/implementation processes of the sending unit, the receiving unit, and the processing unit in FIG. 7 may be implemented by the processor 901 in FIG. 9 by invoking the computer executable instruction stored in the memory 902. Alternatively, the memory 902 stores a computer executable instruction used to implement a function of the processing unit in FIG. 7. A function/implementation process of the processing unit in FIG. 7 may be implemented by the processor 901 in FIG. 9 by invoking the computer executable instruction stored in the memory 902. Functions/implementation processes of the sending unit and the receiving unit in FIG. 7 may be implemented by the transceiver 903 in FIG. 9.

Based on a same concept as the method embodiments, an embodiment further provides a system. Referring to FIG. 2, the system includes a cloud device and a terminal device.

The terminal device is configured to send first information to the cloud device, where the first information is used to indicate a posture and a location of the terminal device at a first moment.

The cloud device is configured to: receive the first information from the terminal device, where the first information is used to indicate the posture and the location of the terminal device at the first moment; render a prestored environment image of the terminal device based on the first information, to obtain a first field of view image, where the first field of view image is a field of view image corresponding to the posture and the location of the terminal device at the first moment; and send information about the first field of view image to the terminal device.

Then, the terminal device is further configured to: receive the information about the first field of view image from the cloud device, where the first field of view image is the field of view image corresponding to the posture and the location of the terminal device at the first moment; and display an image within a field of view range of the terminal device at a second moment based on the information about the first field of view image and a posture change and a location change of the terminal device from the first moment to the second moment, where the second moment is later than the first moment.

For example, when displaying the image within the field of view range of the terminal device at the second moment, the terminal device needs to convert the first field of view image. A specific process is as follows:

The information about the first field of view image includes the first field of view image. The terminal device first converts the first field of view image into a second field of view image based on the location change of the terminal device from the first moment to the second moment. The second field of view image is a field of view image corresponding to a location of the terminal device at the second moment. Then, the terminal device displays the image within the field of view range of the terminal device in the second field of view image based on the posture change of the terminal device from the first moment to the second moment.

To convert the first field of view image into the second field of view image, the terminal device first needs to determine, based on the location change of the terminal device from the first moment to the second moment, depth information of the second field of view image and pixel change information for converting the first field of view image into the second field of view image. Then, the terminal device converts the first field of view image into the second field of view image based on the depth information of the second field of view image and the pixel change information.

The following describes a manner of determining the depth information of the second field of view image and the pixel change information.

1. The information about the first field of view image further includes depth information, and the terminal device determines the depth information of the second field of view image based on the depth information in the information about the first field of view image and the location change of the terminal device from the first moment to the second moment.

2. The information about the first field of view image further includes a motion vector, the motion vector is used to represent change trends of pixels in the first field of view image, and the terminal device determines the pixel change information based on the motion vector and the location change of the terminal device from the first moment to the second moment.

In a possible implementation, before displaying the image within the field of view range of the terminal device at the second moment, the terminal device may further need to determine the field of view range of the terminal device at the second moment based on a posture of the terminal device at the second moment.

To enable the first field of view image to be converted into the second field of view image and cover as many possible field of view ranges as possible of the terminal device at the second moment, a field of view range of the first field of view image should be relatively large. For example, the first field of view image includes an image within a field of view range of the terminal device at the first moment, and a field of view range of the first field of view image is greater than the field of view range of the terminal device at the first moment.

A person skilled in the art should understand that the embodiments may be provided as a method, a system, or a computer program product. Therefore, this disclosure may use a form of a hardware-only embodiment, a software-only embodiment, or an embodiment with a combination of software and hardware. Moreover, this disclosure may use a form of a computer program product that is implemented on one or more computer-usable storage media (including but not limited to a magnetic disk memory, a compact disc ROM (CD-ROM), an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

What is claimed is:

1. A method implemented by a terminal device and comprising:
    sending, to a cloud device, first information indicating a first posture of the terminal device at a first moment and a first location of the terminal device at the first moment, wherein the first posture of the terminal device is a rotation status of the terminal device in space at the first moment, and wherein the first location of the terminal device is a location of the terminal device in space at the first moment;
    receiving, from the cloud device, information about a first field of view (FOV) image corresponding to the first posture and the first location, wherein the information comprises the first FOV image and a depth map of the first FOV image;
    generating a second image within a second FOV range of the terminal device at a second moment and based on the information, a posture change of the terminal device from the first moment to the second moment, and a location change of the terminal device from the first moment to the second moment, wherein the second moment is later than the first moment; and
    displaying the second image.

2. The method of claim 1, wherein the information comprises the first FOV image, and wherein generating the second image within the second FOV range of the terminal device at the second moment and based on the information comprises:
    converting the first FOV image into a second FOV image based on the location change and the depth map, wherein the second FOV image corresponds to a second location of the terminal device at the second moment; and
    generating the second image within the second FOV range in the second FOV image at the second moment based on the posture change.

3. The method of claim 2, further comprising:
    determining, based on the location change and the depth map, second depth information of the second FOV image; and
    further converting the first FOV image into the second FOV image based on the second depth information.

4. The method of claim 3, wherein the information further comprises a motion vector, wherein the motion vector represents change trends of pixels in the first FOV image, and wherein the method further comprises:
    determining pixel change information for converting the first FOV image into the second FOV image based on the motion vector and the location change; and
    further converting the first FOV image into the second FOV image based on the second depth information and the pixel change information.

5. The method of claim 1, wherein before generating the second image, the method further comprises determining the second FOV range based on a second posture of the terminal device at the second moment.

6. The method of claim 1, wherein the first FOV image comprises a first image within a first FOV range of the terminal device at the first moment, and wherein a third FOV range of the first FOV image is greater than the first FOV range.

7. The method of claim 6, wherein the third FOV range is centered on the first FOV range and evenly extended greater than the first FOV range.

8. The method of claim 1, wherein the information further comprises a motion vector, wherein the motion vector represents change trends of pixels in the first FOV image.

9. A method implemented by a cloud device and comprising:
    receiving, from a terminal device, first information indicating a first posture of the terminal device at a first moment and a first location of the terminal device at the first moment, wherein the first posture of the terminal device is a rotation status of the terminal device in space at the first moment, and wherein the first location of the terminal device is a location of the terminal device in space at the first moment;
    rendering a prestored environment image of the terminal device based on the first information to obtain a first field of view (FOV) image, wherein the first FOV image corresponds to the first posture and the first location; and
    sending, to the terminal device, second information about the first FOV image, wherein the second information comprises the first FOV image and a depth map of the first FOV image.

10. The method of claim 9, wherein the second information further comprises a motion vector, wherein the motion vector represents change trends of pixels in the first FOV image.

11. The method of claim 9, wherein the first FOV image comprises an image within a first FOV range of the terminal device at the first moment, and wherein a second FOV range of the first FOV image is greater than the first FOV range.

12. A terminal device comprising:
    a memory configured to store instructions; and
    a processor coupled to the memory and configured to execute the instructions to:
        send, to a cloud device, first information indicating a first posture of the terminal device at a first moment and a first location of the terminal device at the first moment, wherein the first posture of the terminal device is a rotation status of the terminal device in space at the first moment, and wherein the first location of the terminal device is a location of the terminal device in space at the first moment;

receive, from the cloud device, information about a first field of view (FOV) image corresponding to the first posture and the first location, wherein the information comprises the first FOV image and a depth map of the first FOV image;

generate a second image within a second FOV range of the terminal device at a second moment and based on the information, a posture change of the terminal device from the first moment to the second moment, and a location change of the terminal device from the first moment to the second moment, wherein the second moment is later than the first moment; and display the second image.

13. The terminal device of claim 12, wherein the information comprises the first FOV image, and wherein the processor is further configured to:

convert the first FOV image into a second FOV image based on the location change and the depth map, wherein the second FOV image corresponds to a second location of the terminal device at the second moment; and further generate the second image within the second FOV range in the second FOV image at the second moment based on the posture change.

14. The terminal device of claim 13, wherein the processor is further configured to:

determine, based on the location change and the depth map, second depth information of the second FOV image; and further convert the first FOV image into the second FOV image based on the second depth information.

15. The terminal device of claim 14, wherein the information further comprises a motion vector, wherein the motion vector represents change trends of pixels in the first FOV image, and wherein the processor is further configured to:

determine pixel change information for converting the first FOV image into the second FOV image based on the motion vector and the location change; and further convert the first FOV image into the second FOV image based on the second depth information and the pixel change information.

16. The terminal device of claim 12, wherein before generating the second image, the processor is further configured to determine the second FOV range based on a second posture of the terminal device at the second moment.

17. The terminal device of claim 12, wherein the first FOV image comprises a first image within a first FOV range of the terminal device at the first moment, and wherein a third FOV range of the first FOV image is greater than the first FOV range.

18. A system comprising:

a terminal device configured to send first information indicating a first posture of the terminal device at a first moment and a first location of the terminal device at the first moment, wherein the first posture of the terminal device is a rotation status of the terminal device in space at the first moment, and wherein the first location of the terminal device is a location of the terminal device in space at the first moment; and a cloud device configured to:
  receive, from the terminal device the first information;
  render a prestored environment image of the terminal device based on the first information to obtain a first field of view (FOV) image, wherein the first FOV image corresponds to the first posture and the first location; and
  send, to the terminal device, second information about the first FOV image, wherein the second information comprises the first FOV image and a depth map of the first FOV image, wherein the terminal device is further configured to:
  receive, from the cloud device, the second information;
  generate a second image within a second FOV range of the terminal device at a second moment and based on the second information, a posture change of the terminal device from the first moment to the second moment, and a location change of the terminal device from the first moment to the second moment, wherein the second moment is later than the first moment; and
  display the second image.

19. The system of claim 18, wherein the second information comprises the first FOV image, and wherein the terminal device is further configured to:

convert the first FOV image into a second FOV image based on the location change and the depth map, wherein the second FOV image corresponds to a second location of the terminal device at the second moment; and further generate the second image within the second FOV range in the second FOV range at the second moment based on the posture change.

20. The system of claim 19, wherein the terminal device is further configured to:

determine, based on the location change and the depth map, second depth information of the second FOV image; and further convert the first FOV image into the second FOV image based on the second depth information.

21. The system of claim 20, wherein the second information further comprises a motion vector, wherein the motion vector represents change trends of pixels in the first FOV image, and wherein the terminal device is further configured to:

determine pixel change information for converting the first FOV image into the second FOV image based on the motion vector and the location change; and further convert the first FOV image into the second FOV image based on the second depth information and the pixel change information.

22. The system of claim 21, wherein before generating the second image, the terminal device is further configured to determine the second FOV range based on a second posture of the terminal device at the second moment.

* * * * *